Herman H. Mueller
INVENTOR.

BY Clarence A. O'Brien
and Harvey B. Jacobson
Attorneys

Oct. 15, 1957 H. H. MUELLER 2,809,840

RECORD LOWERING AND RELEASING MEANS FOR AUTOMATIC INTERLOCKING AND CONVENTIONAL RECORD PLAYERS

Filed Nov. 3, 1952 2 Sheets-Sheet 2

Herman H. Mueller
INVENTOR.

BY Clarence A. O'Brien and Harvey B. Jacobson
Attorneys 2,809,840

RECORD LOWERING AND RELEASING MEANS FOR AUTOMATIC INTERLOCKING AND CONVENTIONAL RECORD PLAYERS

Herman H. Mueller, Ephrata, Pa.

Application November 3, 1952, Serial No. 318,365

11 Claims. (Cl. 274—10)

This invention comprises novel and useful improvements in a record lowering and releasing means for automatic interlocking and conventional record players, and more specifically relates to a mechanism which will firmly and positively support a record while gently lowering the same from the bottom of a stack of records to the elements of the record player which support and drive the record during the playing of the same.

The primary object of this invention is to provide a mechanism which will support and gently lower a record from the bottom of the stack to the elements of the apparatus which support and rotate the record during the playing of the same, in contrast to present conventional mechanisms which after releasing a record permit the same to drop or fall to the supporting and driving members.

A further important object of the invention is to provide a mechanism either alone or in conjunction with the preceding object, whereby a stack of records is supported in an improved manner and whereby the lowermost record may be released from the stack in an improved manner.

Yet another important object of the invention is to provide a mechanism in conformity with the above mentioned objects in which the action of the mechanism shall be cushioned to prevent the imposition of undue strains to the mechanism during its operation.

A still further object of the invention is to provide an improved record supporting and releasing mechanism whereby a stack of records may be supported in an improved manner, by a holding means engaging the lowermost record of the stack; and wherein an auxiliary holding means may be positioned beneath the next to the lowermost record of the stack for holding that record simultaneously with, or in timed relation to, the release of the holding means for the lowermost record.

Yet another specific object of the invention is to provide a pair of holding means as set forth in the preceding object together with an actuator for the same, whereby the holding means may be actuated in alternation or in timed relation to the operation of the other instrumentalities of a phonograph record player.

A still further specific object of the invention is to provide a mechanism in accordance with the above mentioned objects in which the actuator for the pair of record holding means carries and operates a means for supporting and lowering a record when released by a holding means from the bottom of the stack of records.

An additional object is to provide a pair of record holding means in accordance with the foregoing objects, which will permit a stack of records to be readily lifted past the holding means for removal from the spindle.

A further important object of the invention is to provide an apparatus wherein an adjustable resistance to the operation of the pair of record holding means is provided; and wherein the amplitude of movement of the actuating means for the record holding means may be adjustably varied as desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

At the outset, it should be understood that the essential and basic principles of this invention, namely, the supporting of a record which has been released from the bottom of a stack of records and gently lowering rather than dropping such record to its position upon the record driving means, and the improved mechanism for holding or supporting a stack of records in such a manner as to release the lower-most record to the record lowering means while continuing to support the rest of the stack of records, are applicable to many different types of conventional automatic record players.

In addition, however, the stack supporting and the record releasing and lowering device disclosed herein is especially adapted for use with interlocking phonograph records of the type set forth in my prior co-pending application, Serial No. 296,383, for Positive Engagement Interlocking Phonograph Record Disk, filed June 30, 1952; and the dual phonograph record player of the type set forth in my co-pending prior application, Serial No. 98,048 and Serial No. 296,382 for Automatic Interlocking Dual Phonograph Record Player and Turntable and Drive for Automatic Interlocking Dual Phonograph Record Player, filed June 9, 1949, and June 30, 1952, and accordingly, for purposes of illustrating the applicability of the present invention, the pertinent portions of the apparatuses and records disclosed in my above mentioned co-pending applications have been illustrated with the present invention applied thereto.

Figure 1:
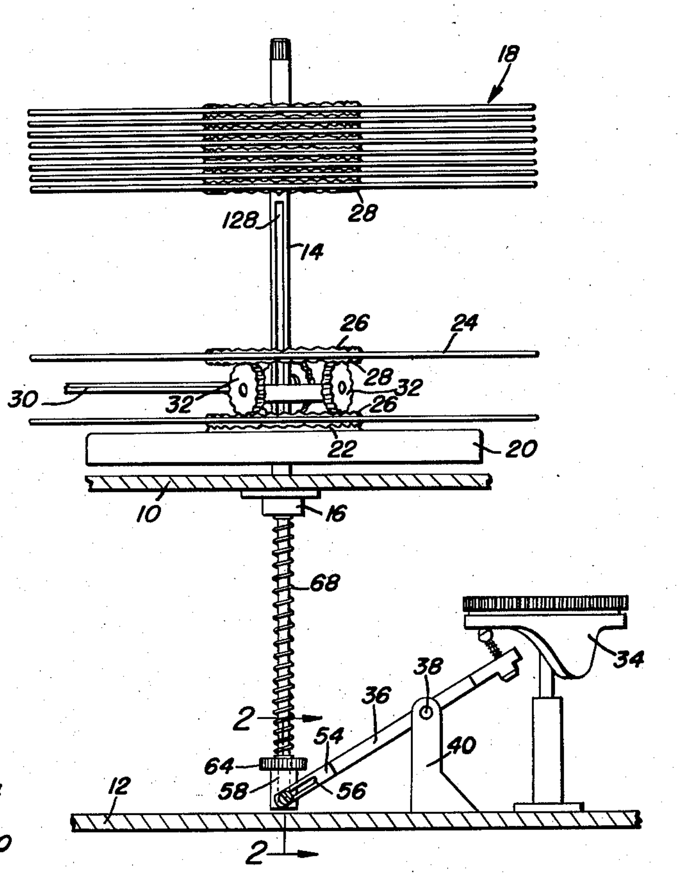
Figure 1 is a fragmentary view partly in elevation and partly in vertical section diagrammatically indicating a record lowering and releasing means in accordance with this invention, the parts being shown in the position assumed when the mechanism has completed its record lowering and releasing operation and the record is in position to be played upon its lower surface.

Referring first to Figure 1, it will be seen that certain conventional portions of a phonograph record player have been illustrated, these including the top wall 10 and a bottom wall or horizontal supporting surface 12 of a phonograph record player cabinet, together with a hollow spindle 14 secured to the cabinet top wall 10 as by a fastening nut 16 and extending above the cabinet. There is further illustrated a stack of records 18 which are adapted to be carried by the spindle 14 adjacent the top portion of the same, this spindle constituting a support for receiving the stack of records thereon. The stack 18 may be supported by the top portion of the spindle 14 in any conventional manner or by the specific record supporting and holding means disclosed in these drawings and referred to hereinafter.

The conventional machine is further provided with a turntable 20 driven by a suitable and conventional mechanism, not shown, and there is further provided, in accordance with conventional usage, a mechanism for automatically releasing records from the bottom of the stack 18, in timed relation to the operation of the rest of the automatic record player, which released records may drop to the turntable 20 or the stack of records accumulating thereon to be played by the tone arm, not shown, in the usual manner.

However, in the present invention, the turntable 20 is illustrated as having a record driving, interlocking ring 22 upon its upper surface, and each record 24 is likewise illustrated as having complementary interlocking members or rings 26 and 28 upon the upper and lower surfaces of the same, upon that portion of the record which lies within the sound track and surrounds the spindle aperture. Records of this type are fully disclosed in my above mentioned co-pending applications, so that when a record rests upon the turntable or upon another record, the engagement of the complementary interlocking rings 22, 26 or 28 will positively prevent any relative rotation or slippage between the records to thus ensure and maintain the rotation of the records at the same speed as that of the turntable to thereby secure perfect tonal reproduction from the sound track.

Also disclosed in Figure 1 is a supporting arm 30 having journaled upon its end a plurality of peripherally toothed rollers 32 which are adapted to engage the interlocking rings 22, 26 and 28. As set forth in my above mentioned co-pending application, Serial No. 98,048, the arm 30 with the supporting and driving rollers 32 carried thereby is adapted to rest upon the interlocking ring 22 of the turntable 20; or upon the top-most record of a stack of records resting upon the turntable whereby the turntable and the interposed records will impart rotation to the rollers 32. The latter, in turn, are adapted to support a record when released from the bottom of the stack 18, by engagement of the rollers 32 with the interlocking ring 28, whereby the supported record 24 may be driven or rotated when the lower sound track of the same is played by the tone arm of the mechanism of my above identified co-pending applications. Since, however, an explanation of the structure of the supporting arm 30 and the supporting and driving rollers 32 and their associated mechanism is not necessary for an understanding of the novel features set forth and claimed in the present application, a detailed description in addition to the broad description previously set forth is deemed to be unnecessary.

As disclosed in Figure 1, there is further provided a cam 34 which is operated by suitable mechanism, not shown but of any conventional design, in synchronization with the movement of the other elements of the automatic record player. The cam 34 periodically actuates a lever 36 which intermediate its extremities is journaled as at 38 upon a bracket or support 40 suitably mounted within the record player cabinet. The lever 36, in turn, is operatively connected with the mechanism whereby a record is released from the stack 18 and is lowered to the record supporting and revolving means, which may be either the supporting rollers 32 or may be the interlocking ring 22 of the turntable 20, if the supporting and driving rollers are omitted from the apparatus, or are temporarily rendered inoperative by being withdrawn from their position above the turntable, as set forth in my above identified co-pending applications.

Figure 8:
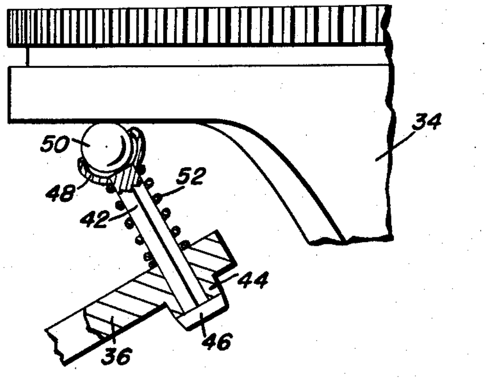
Figure 8 is a fragmentary detail view upon an enlarged scale of the actuating cam, the actuating lever and a yieldable and anti-friction cam follower carried by the latter and engaging the former.

Referring now more specifically to Figure 8, it will be seen that the lever 36 is operatively connected with the cam 34 by means of a resilient anti-friction cam follower interposed therebetween. This cam follower preferably consists of a plunger 42 which is slidable through an apertured boss 44 at one extremity of the lever 36, and is provided with a head 46 which limits movement of the plunger towards the cam 34. At the other extremity from the head 46, the plunger 42 is provided with a cup 48 in which is rotatably retained an anti-friction ball 50 which engages with and is operated by the cam 34. A compression spring 52 surrounds the plunger 42 and is interposed between the lever 36 and the ball retainer 48 to yieldingly urge the plunger and ball outwardly of the lever and towards the cam 34. The spring 52 is sufficiently stiff so that during normal oscillation of the lever 36 by the cam 34, there will be no relative movement between the plunger and the lever. However, if for any reason the mechanism associated with the lever 36 encounters a predetermined resistance or obstruction to its oscillation, the spring 52 will yield and permit sliding movement of the plunger in the lever, thereby cushioning the operating mechanism associated with the lever.

Figure 2:
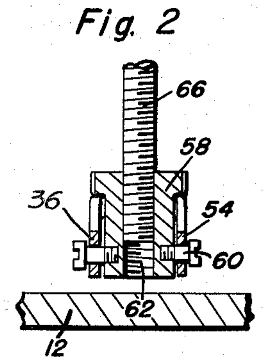
Figure 2 is a vertical transverse sectional detail view taken substantially upon the plane indicated by the section line 2—2 of Figure 1 and showing a connector for adjustably securing the actuator of the record releasing and lowering means to its actuating lever.

At its other extremity, as shown in Figures 1 and 2, the lever 36 is preferably provided with a pair of forked arms 54 which are longitudinally slotted as at 56. A connector 58 is disposed between and pivotally secured to the arms, as by means of removable pivot screws 60 which are slidable in the slots 56 and which are screw threaded into opposite sides of the connector 58, the latter consisting of an axially bored member which is internally threaded as at 62. At its upper end, the connector 58 is provided with a flat surface which is adapted to be engaged by a lock nut 64 which is screw threadedly engaged upon the lower screw threaded extremity of a rod 66 which is threaded into the bore 62, and which constitutes an actuator for the record holding means to be subsequently described.

The actuator 66 extends upwardly into the hollow spindle 14 for sliding movement longitudinally thereof and a compression spring 68 surrounds the actuator 66 and at its upper end abuts against the spindle holding nut 16, and at its lower end bears against the lock or adjusting nut 64. It will thus be seen that the spring yieldingly urges the actuator downwardly relative to the spindle and also yieldingly urges the lever 36 into contact with the cam 34.

As so far described, it will now be apparent that by releasing the screws 60, the connector 58 may be readily adjusted to thus vary the position of the actuator 66 with respect to the lever 36, and consequently, to vary the top and bottom limits of the vertical travel of the actuator for a given amplitude of oscillation of the lever 36 by the cam 34.

Figure 7:
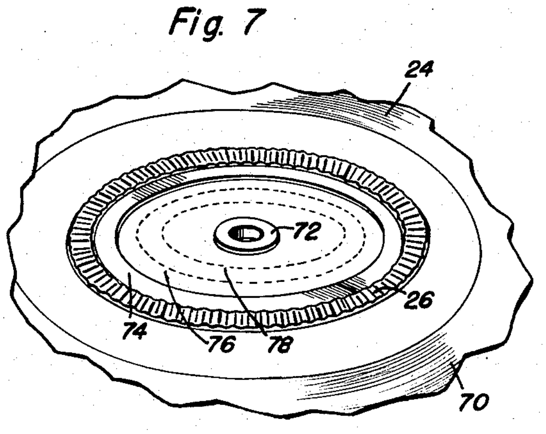
Figure 7 is a fragmentary view of a portion of an interlocking phonograph record disk which is particularly adapted for use with the present invention.

At this point, attention is directed more specifically to Figure 7, wherein it will be seen that a record 24 has the interlocking ring 26 disposed about the centrally apertured portion thereof and within the sound track which is indicated generally by the numeral 70.

As clearly set forth in my co-pending applications, Serial No. 296,383 and Serial No. 98,048, the rings 26 and 28 may be integrally formed upon the record disk 24 during its manufacture; or may be separately applied thereto after its manufacture. Disposed through the central spindle receiving aperture of the record disk 24, there is provided a re-enforcing and wear receiving sleeve or thimble 72, shown best in Figures 3 and 4.

Also disposed within the interlocking rings 26 and/or 28 are one or more rings 74, 76 or 78, which, as set forth in my co-pending application, Serial No. 347,507, filed April 8, 1953, are adapted to actuate a mechanism whereby the turntable is automatically adjusted to the proper speed for playing that particular record, and a proper needle for playing the same is likewise selectively positioned in the tone arm.

Figures 3, 4, 5, 6, 9:
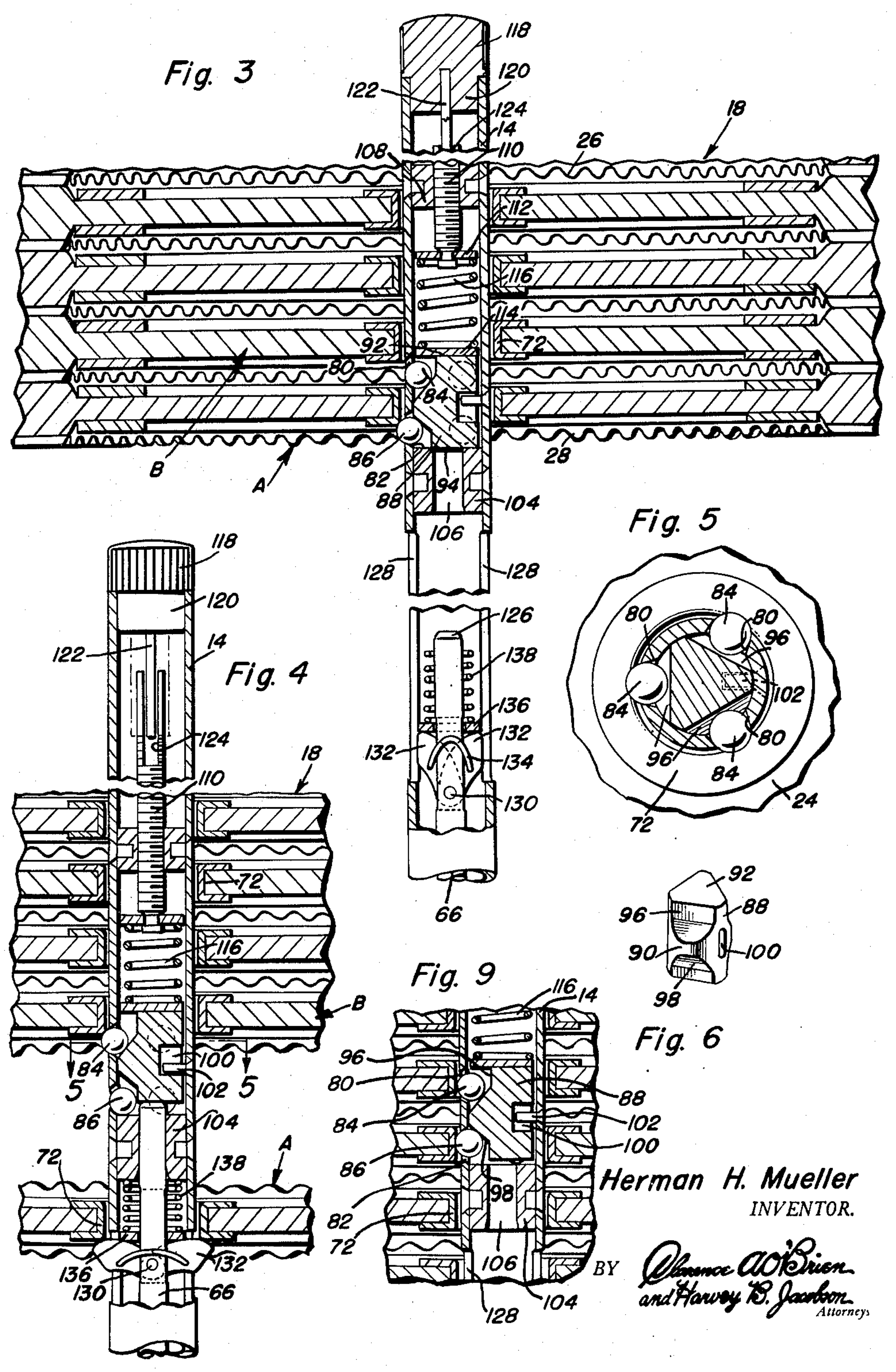
Figure 3 is an enlarged vertical sectional detail view through a portion of a spindle showing a stack of records supported thereby, the record holding means being indicated in the position assumed when the stack of records is supported and prior to actuation of the record releasing and lowering means, parts being broken away.
Figure 4 is a fragmentary view of a portion of Figure 3, the parts being shown in the alternative position assumed when the lower holding means has been actuated to release the lowermost record and the latter rests upon the record lowering mechanism preparatory to being lowered to the record supporting and driving elements of the record player.
Figure 5 is a horizontal sectional view taken substantially upon the plane indicated by the section line 5—5 of Figure 4 and showing certain structural details of the upper record holding means during releasing of the lower record holding means and the operator therefor.
Figure 6 is a perspective view of the operator for alternately actuating the upper and lower record holding means.
Figure 9 is an enlarged detail view similar to Figure 3 showing the manner in which the record supporting means permits a stack of records to be removed from the spindle.

Reference is now particularly directed to Figures 3–6 for an understanding of the record holding and releasing mechanism. Adjacent its upper end, the spindle 14 is provided with upper and lower sets of openings 80 and 82. Any desired number of openings may be provided in the sets, three openings for each set being illustrated for purposes of convenience, as shown in Figure 5, although in some instances, a single opening may be found sufficient. It is to be understood that the principles of this invention are not limited to any particular number of openings. Upper and lower holding means are movably mounted upon the spindle in association with the upper and lower openings 80 and 82, these holding means being indicated by the numerals 84 and 86. These holding means are disposed within the spindle but are selectively movable by an operator, to be hereinafter described, to cause the holding members to be extended through the openings whereby they serve to support the lower surfaces of the re-enforcing rings 72 of the records 18, as set forth hereinafter.

The holding members have been illustrated as consisting of balls, although it will be appreciated that they may be of any desired character and the principles of the invention are not limited to the particular structure of these members and their actuating mechanisms.

Preferably, however, the size of the openings 80 and 82 is such that the holding members 84 and 86 may be extended partially therethrough but cannot pass entirely through the openings, as will be readily apparent from Figures 3, 4 and 5. Alternatively, in operation, the holding members may be retracted into the interior of the spindle where they will not protrude beyond the exterior surface thereof. The openings 80 and 82 are longitudinally spaced by a distance which is approximately equal to the thickness of a record when disposed in the stack of records 18. Thus, the lower holding members 86 when disposed through their openings 82 will engage the bottom surface of the ring 72 of the lower-most record upon the stack as shown in Figure 3 and as indicated by the numeral A. At the same time, the upper holding members 84 are in position to be engaged under the lower surface of the next to the lowermost record, as indicated by the numeral B in Figure 3.

An operator is provided to selectively extend one set of holding members from its openings while permitting the other set to be retracted by their own weight into the interior of the spindle.

While I have found gravity to be sufficient for causing the holding members to automatically be retracted into the interior of the spindle except when they are positively extended or advanced therefrom by the operator to be now described, it is also to be understood that I may utilize any suitable means for ensuring the retraction of the holding members into the interior of the spindle, as by springs or the like.

An operator, indicated generally by the numeral 88, is provided for positively selectively and in alternation advancing a set of holding members from the spindle into supporting and holding engagement with the associated record of the stack of records. This operator preferably comprises an elongated substantially cylindrical body which at about its mid-portion is provided with an annular flange 90 adapted to be loosely and slidably engaged with the interior wall of the spindle for axial sliding movement therealong. The upper and lower surfaces 92 and 94 respectively of the operator are preferably disposed in parallel planes. Between the central annular flange 90 and the upper and lower surfaces are provided reversely inclined wedging surfaces 96 and 98 respectively. These surfaces are provided, one for each holding member, upon the operator in order to simultaneously operate the plurality of holding members in each set. However, it is understood that there will be the same number of wedging surfaces as there are holding members in each set.

The wedging members are reversely inclined so that when axial movement of the operator causes one set of surfaces to extend one set of holding members from their openings, the other set of wedge surfaces will provide clearance permitting the other set of holding members to be retracted by their own weight into the interior of the spindle. The wedging surfaces are so proportioned as to prevent complete displacement of the holding members from their respective openings, but to allow substantially complete retraction of the members into the spindle and effective extension of the members from the spindle to obtain the desired record releasing or record supporting and holding functions.

The operator is further provided with a diametrically disposed slot 100 which is elongated longitudinally of the operator and which, as shown in Figures 3–5 and 9, is adapted to be engaged by a retaining pin 102 which extends inwardly from one wall of the spindle and into this slot. This pin permits a limited axial or longitudinal reciprocation of the operator 88, but prevents relative rotation of the same, thereby ensuring that the wedge or cam surfaces 96 and 98 will properly cooperate with the holding members 84 and 86.

A guide bushing 104, having a central guide bore 106 therein, is secured in the spindle by suitable fasteners. This guide bushing has a flat upper surface which is adapted to support the flat lower end or face 94 of the operator 88 and thereby limit the downward travel of this operator. The position of the bushing is such that the operator when resting thereon is supported in a position in which the lower wedge surfaces 98 will cause the lower holding means 86 to be extended through their openings 82, in which position they will support, as shown in Figure 3, the lowermost record A of the stack 18. When in this position, the wedge surfaces 96 will, of course, permit the upper locking members to be retracted by their weight into the spindle whereby the record B is supported solely by resting upon the record A.

A means is provided for resiliently and adjustably urging the operator 88 downwardly into seated engagement upon the bushing 104, as shown in Figure 3. This last mentioned means includes a bushing 108 having an internally threaded bore receiving therethrough the adjusting screw 110, which at its lower end carries an adjusting plate 112. A spring seating plate or washer 114 rests freely upon the upper face 92 of the operator 88, and a compression spring 116 is disposed in the spindle between the plates 112 and 114. Thus, as the screw 110 is moved downwardly, the force of the spring 116 will be increased. In order to adjust the spring pressure, the upper end of the spindle is provided with a closure cap 118 having a diametrically reduced portion 120 which frictionally is engaged in the upper end of the spindle. Carried by the inward extremity of the cap is a blade 122 which engages in a corresponding diametrical slot 124 formed in the upper end of the screw 110. By this means, rotation of the cap will cause rotation of the screw while permitting axial movement of the screw to vary the pressure of the spring 116. The operator 88 is thus spring loaded towards its lower position, which is the normal position in which the stack of records 18 is supported at all times except when the record changer mechanism of the record player is being actuated to release a record from the bottom of the stack.

The actuator 66, previously mentioned, has its upper extremity tapered as at 126 to facilitate passage of the actuator into the flaring lower end of the bore 106 in the guide bushing 104. As will be readily understood, the actuator is periodically lifted by the cam 34 and associated mechanism, during the record changing portion of the cycle of operation of the record player, and when so lifted will pass through the bore 106 and engage the bottom face 94 of the operator 88 thereby lifting the latter. As the operator is lifted, the upper holding means are moved outwardly from the spindle and into contact with the next to the lowermost record B, as shown in Figure 4, to support that record and the stack superimposed thereupon, while the lower wedge surfaces 98 release the lower holding means 86 and permit the lowermost record A to move downwardly upon the spindle to the record lowering means to be hereinafter described. Immediately upon the release of the lower record A, the actuator 66 descends, permitting the spring 116 to lower the operator from the position just described and which is shown in Figure 4, thereby simultaneously causing the lower holding members 86 to be returned to the position shown in Figure 3, while the upper set 84 is being retracted.

It should be clearly understood that it is only the last portion of the upward stroke of the actuator 66 which is effective to actuate the two sets of holding members to thus release the lower record from the stack.

Means are provided for lowering the released record from the stack to the record supporting and driving means whether the latter consists of the rollers 32 or the turntable 20 and/or the stack of records resting thereon. For this purpose, the spindle is provided with one or more longitudinally extending slots 128 which extend from immediately below the bushing 104 down to the turntable. Pivoted to the actuator 126 as by a pivot pin 130 is one or more fingers or members 132, normally retained in a collapsed position, a shown in Figure 3, by any suitable spring means 134 at which time these members while riding in the slots 128 will not extend beyond the exterior surface of the spindle. However, resting upon these fingers 132 is a washer or plate 136 and a compression spring 138 surrounds the upper end of the actuator 66 and rests upon the plate 136.

It will now be apparent that spring 134 will maintain the fingers 132 in their collapsed position, until the actuating member has sufficiently completed its upward travel. At this time, the spring 138 will engage the lower surface of the bushing 104 and upon being compressed by further upward travel of the actuator, will overpower the spring 134 and cause the pivoting movement of the fingers 132 until the latter are extended through the slots as shown in Figure 4. This extension will occur substantially at the time the upper end of the actuator passes through the bore 106 and lifts the operator 88, thereby extending the upper holding means 84 to hold the record B and permitting retraction of the holding means 86 to allow the record A to drop from the bottom of the stack and to the fingers 132. While the extent of this dropping movement of the record A from the bottom of the stack to the fingers 132 has been somewhat exaggerated in Figure 4, it will be apparent that the actual amount of free fall will be so small as to be substantially negligible. As the actuator descends, the weight of the record A upon the fingers will keep the same extended until the record has been lowered either upon the supporting rollers 32, or upon the turntable or stack of records carried thereby. Further downward travel of the actuator will then release the spring 134 whereby the arms shall be retracted, as shown in Figure 3, in readiness for the next operation.

It should be distinctly understood that in some instances, the record lowering mechanism may be utilized independently of the specific record supporting and releasing mechanism, and vice versa. In addition, it may be deemed sufficient to omit the upper holding members 84, and rely upon the quickness of the movement of the actuator for momentarily releasing the holding members 86, permitting the record A to drop, and then expanding the members 86 to catch and support the next record B.

The specific record supporting and releasing mechanism hereinbefore described is also inherently capable of permitting a record, or a stack of records which have been lowered by the device to be lifted up the spindle past the supporting means for removal from the spindle.

For this purpose, it will be observed in the enlarged view of Figure 9, the spindle openings 80, 82 for the balls 84, 86 are vertically elongated to permit a limited vertical movement of the balls therein, while being sufficiently narrow in width to prevent movement of the balls outwardly through the opening.

After a record has been lowered from the stack by the fingers 132 and deposited upon either the turntable or the supporting and driving rollers, the actuator 66 and the operator 88 will again assume their normal rest or idle positions shown in Figure 3. At this time, the operator 88 rests upon the bushing 104, being held thereon by its own weight, and by the spring 116. When it is desired to remove the records on the spindle, some or all of which may now be disposed below the lower holding means 86, the records are lifted manually up the spindle until the sleeve 72 of the topmost record engages the lower exposed surfaces of the lower balls 86.

Continued upward movement of the records lifts the balls 86 upwardly to the top of the openings 82, the balls 86 also lifting the operator 88, against the spring 116, from its seat upon the bushing 104, as shown in Figure 9. The pressure of the top and outer portions of the balls 86 against the top edge of the openings 82 moves the balls 86 inwardly of the spindle and downwardly relative to the wedge surfaces 98. Thus the balls 86 are retracted, permitting the records to pass.

As the operator 88 is moved upwardly as just described, it lifts the upper balls 84, until the latter engage the upper edge of the openings 80. Further upward travel causes the balls to be forced inwardly, thus permitting the records to pass the upper balls also.

It is evident that the other features of this invention, as set forth hereinbefore do not require the specific proportionary above described to permit the records to be readily withdrawn; but that any other described construction may be provided for this purpose.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In an automatic record player having a hollow spindle for receiving a stack of records thereon and means for supporting and revolving a record released from the stack for playing the same, said spindle having upper and lower openings, upper and lower means disposed in said spindle and extensible through said openings for respectively engaging the next to the lowermost and the lowermost records of a stack of records received on said spindle, an operator vertically slidable in said spindle, a stop member fixed in said spindle below said lower opening for limiting downward movement of said operator, said operator having upper and lower oppositely inclined operating surfaces operatively associated with said upper and lower means for alternate extension of the same from said openings upon vertical reciprocation of said operator, means slidable in said spindle for supporting and gently lowering while supporting a record from the stack to said supporting and revolving means and for actuating said operating means, said slidable means including a member engaging said operator for lifting the latter from said stop member for vertical sliding movement of said operator.

2. In an automatic record player having a hollow spindle for receiving a stack of records thereon and means for supporting and revolving a record released from the stack for playing the same, said spindle having upper and lower openings, upper and lower means disposed in said spindle and extensible through said openings for respectively engaging the next to the lowermost and the lowermost records of a stack of records received on said spindle, an operator vertically slidable in said spindle, said operator having upper and lower oppositely inclined operating surfaces operatively associated with said upper and lower means for alternate extension of the same from said openings upon vertical reciprocation of said operator, means slidable in said spindle for supporting and gently lowering while supporting a record from the stack to said supporting and revolving means and for actuating said operating means, a guide bushing in said spindle, said supporting and lowering means including a member slidable through said bushing for abutting operating engagement with said operator.

3. In an automatic record player having a hollow spindle for receiving a stack of records thereon and means for supporting and revolving a record released from the stack for playing the same, said spindle having upper and lower openings, upper and lower means disposed in said spindle and extensible through said openings for respectively engaging the next to the lowermost and the lowermost records of a stack of records received on said spindle, an operator vertically slidable in said spindle, said operator having upper and lower oppositely inclined operating surfaces operatively associated with said upper and lower means for alternate extension of the same from said openings upon vertical reciprocation of said operator, means slidable in said spindle for supporting and gently lowering while supporting a record from the stack to said supporting and revolving means and for actuating said operating means, a guide bushing in said spindle, said supporting and lowering means including a member slidable through said bushing for abutting operating engagement with said operator, said bushing being positioned to constitute a stop to limit movement of said operator in one direction.

4. In an automatic record player having a hollow spindle for receiving a stack of records thereon and means for supporting and revolving a record released from the stack for playing the same, said spindle having upper and lower openings, upper and lower means disposed in said spindle and extensible through said openings for respectively engaging the next to the lowermost and the lowermost records of a stack of records received on said spindle, an operator vertically slidable in said spindle, said operator having upper and lower oppositely inclined operating surfaces operatively associated with said upper and lower means for alternate extension of the same from said openings upon vertical reciprocation of said operator, means slidable in said spindle for supporting and gently lowering while supporting a record from the stack to said supporting and revolving means and for actuating said operating means, a guide bushing in said spindle, said supporting and lowering means including a member slidable through said bushing for abutting operating engagement with said operator, a compression spring carried by said member for engagement with said bushing when the member is in operative contact with said operator.

5. The combination of claim 4 including a resilient means in said spindle urging said operator against said bushing.

6. The combination of claim 5 including means within the upper end of said spindle for adjusting said resilient means.

7. In an automatic record player having a hollow spindle for receiving a stack of records thereon and means for supporting and revolving a record released from the stack for playing the same, said spindle having upper and lower openings, upper and lower means disposed in said spindle and extensible through said openings for respectively engaging the next to the lowermost and the lowermost records of a stack of records received on said spindle, an operator vertically slidable in said spindle, said operator having upper and lower oppositely inclined operating surfaces operatively associated with said upper and lower means for alternate extension of the same from said openings upon vertical reciprocation of said operator, means slidable in said spindle for supporting and gently lowering while supporting a record from the stack to said supporting and revolving means and for actuating said operating means, a guide bushing in said spindle, said supporting and lowering means including a member slidable through said bushing for abutting operating engagement with said operator, a compression spring carried by said member for engagement with said bushing when the member is in operative contact with said operator, said supporting and lowering means including fingers pivoted to said member.

8. In an automatic record player having a hollow spindle for receiving a stack of records thereon and means for supporting and revolving a record released from the stack for playing the same, said spindle having upper and lower openings, upper and lower means disposed in said spindle and extensible through said openings for respectively engaging the next to the lowermost and the lowermost records of a stack of records received on said spindle, an operator vertically slidable in said spindle, said operator having upper and lower oppositely inclined operating surfaces operatively associated with said upper and lower means for alternate extension of the same from said openings upon vertical reciprocation of said operator, means slidable in said spindle for supporting and gently lowering while supporting a record from the stack to said supporting and revolving means and for actuating said operating means, a guide bushing in said spindle, said supporting and lowering means including a member slidable through said bushing for abutting operating engagement with said operator, a compression spring carried by said member for engagement with said bushing when the member is in operative contact with said operator, said supporting and lowering means including fingers pivoted to said member, said spring when compressed by said bushing engaging said fingers and yieldingly urging them into an extended, record supporting position.

9. In an automatic record player having a hollow spindle, means in said spindle and extensible therefrom for engaging the lowermost record of a stack of records whereby the stack is supported upon the spindle, a second means in said spindle and extensible therefrom for engaging the next to the lowermost record of the stack and supporting the stack upon the spindle when the lowermost record is released from the stack, a third means in said spindle and extensible therefrom for receiving the lowermost record when released from the stack by said first means and supporting while gently lowering the lowermost record from the stack to a playing means, an operating means in said spindle for actuating said first and second means in alternation and a fourth means carried by said third means for operating said operating means.

10. The combination of claim 9 including a guide bushing in said spindle, resilient means normally holding said third means in retracted position, means engaging said bushing for yieldingly urging the fourth means out of operative contact with said operating means and for overriding said resilient means and rendering said third means operative.

11. The combination of claim 9 wherein each of said first and second means operatively engages the underside of a record adjacent the spindle aperture of the record.

References Cited in the file of this patent

UNITED STATES PATENTS

| | | |
|---|---|---|
| 1,390,404 | Wahlberg | Sept. 13, 1921 |
| 2,512,701 | Weaver | June 27, 1950 |

| | | |
|---|---|---|
| 2,544,230 | Johnson | Mar. 6, 1951 |
| 2,555,910 | Wilber | June 5, 1951 |
| 2,579,175 | Dale | Dec. 18, 1951 |
| 2,604,325 | Hansen | July 22, 1952 |
| 2,620,194 | De Boer | Dec. 2, 1952 |
| 2,622,885 | Mullaney et al. | Dec. 23, 1952 |
| 2,626,157 | Jablonski | Jan. 20, 1953 |
| 2,682,412 | Carlson | June 29, 1954 |

FOREIGN PATENTS

| | | |
|---|---|---|
| 377,173 | Great Britain | Jan. 16, 1931 |